Jan. 14, 1958 S. STOKLAND 2,819,822
FERTILIZER DISTRIBUTER AND PLANTER
Filed Dec. 12, 1955 4 Sheets-Sheet 3

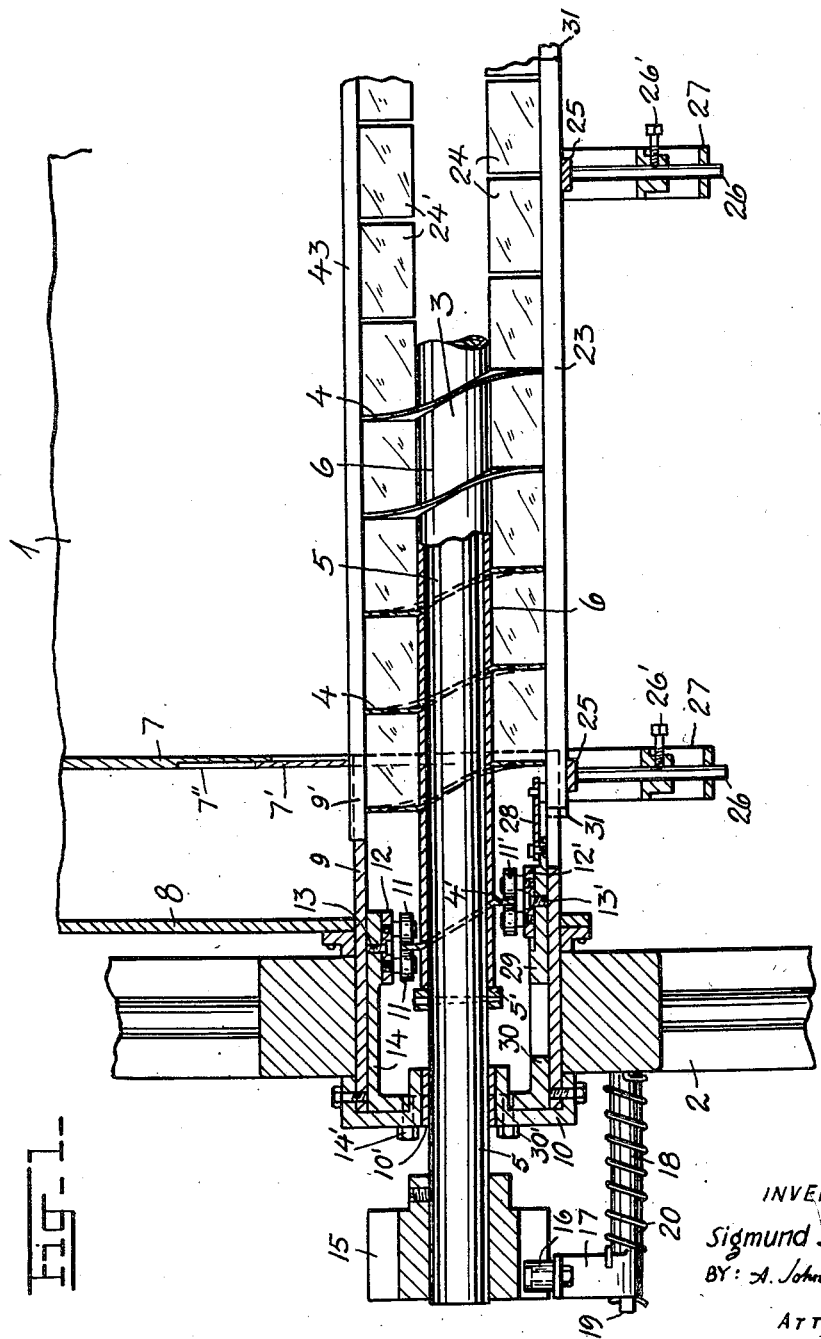

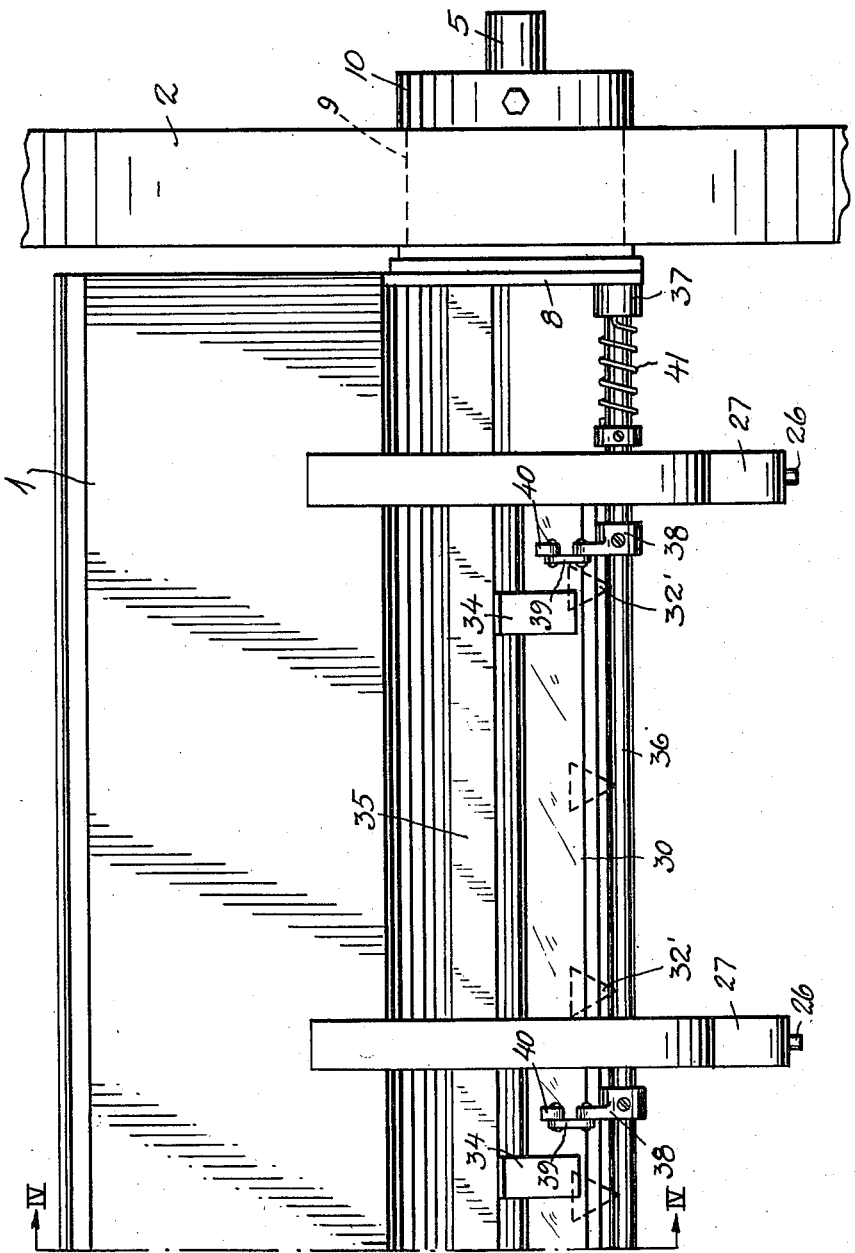

INVENTOR:
Sigmund STOKLAND
By John Michel
ATTORNEY

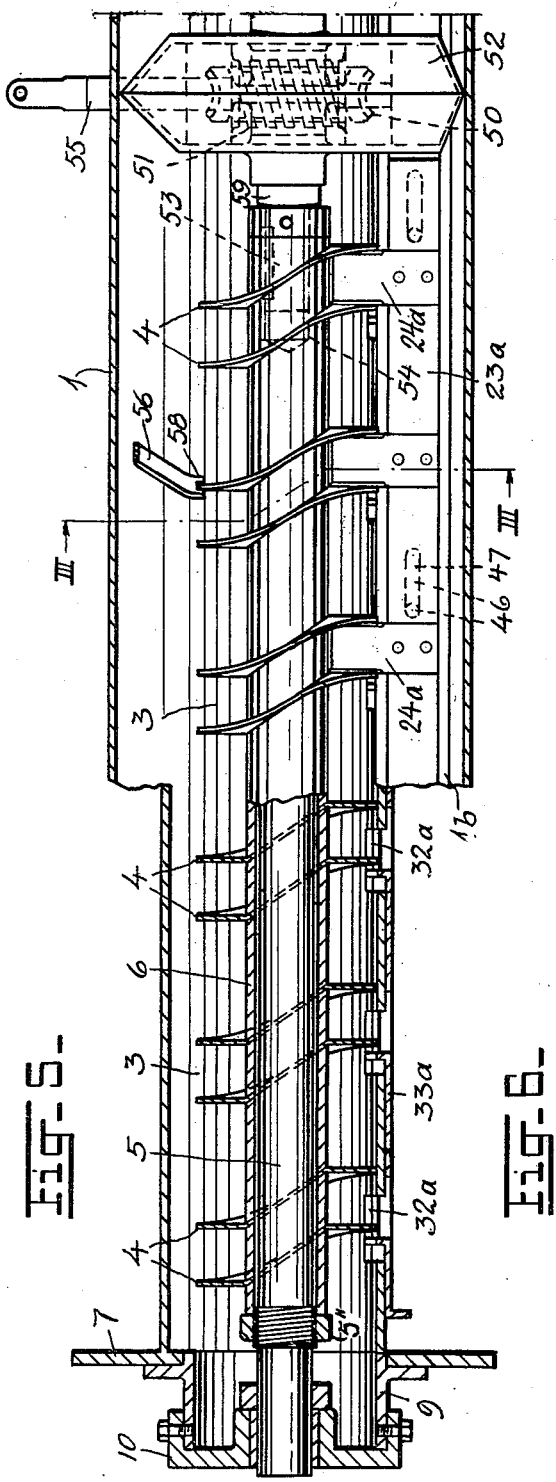

United States Patent Office 2,819,822
Patented Jan. 14, 1958

2,819,822

FERTILIZER DISTRIBUTER AND PLANTER

Sigmund Stokland, Oslo, Norway

Application December 12, 1955, Serial No. 552,541

27 Claims. (Cl. 222—136)

The present invention relates to an agricultural machine adapted to be employed as a spreader of granular material from a supply hopper. The machine is useful for the distribution of soil treating materials, as for example fertilizer, as well as grain and seed.

It is an object of the invention to improve the feeding means for regulating the quantity and flow of material through the discharge openings and to prevent clogging of material, such for instance, as the soil treating materials, which at times become moist and difficult to feed.

A further object of the invention is to provide feeding means by which the material may be discharged in the desired quantity, either in a continuous stream in the whole width of the supply box or in rows with desired intervals, regardless of the consistency of the material, the quantity of material in the supply container, ground conditions etc.

Another object is to provide a machine which makes it possible to deliver simultaneously two different types of fertilizers, seed and fertilizer, peas and grain, or grain alone.

The invention will be described in detail with reference to the accompanying drawings in which:

Figure 1 is a transverse vertical section through a part of a machine according to one embodiment of the invention, Figure 2 is a rear elevation of a part of the machine shown in Fig. 1.

Figure 3 is a vertical cross section on the line III—III in Fig. 5, showing another embodiment, Figure 4 is a vertical cross section on the line IV—IV in Fig. 2, Figure 5 is a horizontal section on the line V—V in Fig. 6, and Figure 6 is a rear elevation of the machine shown in Figs. 4 and 5.

Referring to Figs. 1, 2 and 4 in the drawings, 1 denotes a supply container or hopper of usual type having relatively great width. Driving wheels 2 are mounted at each side of the hopper to support the structure for movement over an area which is to be fertilized or seeded.

The open bottom of the hopper is closed by a longitudinal feeding member having the shape of a roller with parallel circumferential grooves 3 inclined with respect to the axis of the roller and separated by relatively thin partition walls 4 whose side surfaces form right angles with the axis of the roller.

The roller may be cast or machined from a suitable blank. As illustrated, the fins 4 are stamped out of a suitable sheet material and shaped by pressing. The shaped fins are mounted on shaft 5 and spaced apart by sleeves 6 whose ends are shaped to conform with the adjacent surfaces of the wall or fin 4. The assembly is clamped together by suitable means mounted at both ends of shaft 5, such as clamping ring 5' (Fig. 1) or nut 5" (Fig. 5) threadedly mounted on the shaft ends.

The inclination of the grooves 3 with respect to the axis of the roller is conveniently so chosen that the greatest distance between diametrically opposite points of a side confining surface of the groove is at least equal to half the width of the groove.

In the embodiment of Fig. 1, an open-ended sleeve member 9 having a bore corresponding to the outer diameter of the roller is firmly secured in each end wall 7 of the hopper 1 and in the outer walls 8, the inner end of said member being flush with the inner surface of the wall 7.

The outer ends of the tube members are closed by detachably secured cap-shaped end pieces 10 provided with bearings 10' for the core shaft 5 of the roller and in which said shaft may be rotated and displaced axially.

One end of the shaft 5 is provided with a cam 4' positioned within sleeve 9, its effective cam surfaces being parallel to the side surfaces of the partition walls 4. The cam 4' may conveniently be formed as a partition wall having a somewhat smaller diameter than the other walls and be secured on the shaft 5 in a similar manner and together with the partition walls.

At each side of the cam 4' and engaging the surfaces thereof are arranged cam follower rollers 11, preferably consisting of ball-bearings, rotatably supported on a support member 12. The plate 12 is rotatably secured on the inner end of arm 14 by means of a bolt 13 which is positioned centrally between the cam followers 11 and radially with respect to the axis of the shaft of the roller. The outer end of arm 14 is secured to the cap-shaped closing member 10 by bolt 14'. The axis of the bolt 13 is perpendicular to the axis of the roller.

The portions of the members 9 extending outside the walls 8 may serve as bearing shafts for the driving wheels 2 as shown.

The feeding roller may conveniently be driven by one or both driving wheels by means of suitable driving connections.

In the embodiment shown, a ratchet wheel 15 is keyed to the end of the shaft 5. Roll 16, serving as pawl, is secured on the end of an arm 17 projecting from a sleeve member 18 which is rotatably mounted on a bolt 19 projecting from the hub of the wheel 2. The arm 17 with the roller 16 is pressed by means of a spring 20 towards the ratchet 15 so that the wheel 2 during its rotation in the driving direction rotates the ratchet 15 and thereby the shaft of the roller, while the pawl, when the wheel 2 rotates in the opposite direction, rides on the teeth of the ratchet in a manner known per se.

When shaft 5 is rotated, cam 4' is held between the stationary cam followers 11 and imparts an axial reciprocating movement to the shaft, the length of each of the strokes corresponding approximately to half the width of the circumferential grooves. In this manner, each revolution of the shaft causes the lower portion of the rotating fins 3 diametrically opposite to the cam rollers 11 to move axially back and forth with a stroke length corresponding approximately to the width of the grooves 3, while the upper portions of the fins remain stationary during the axial reciprocation of shaft 5.

Due to the mounting of the cam followers 11 on the rotatable support plate 12 in the manner described, they are able to adjust themselves according to the course of the cam 4' and to engage the side surfaces of the cam at all times so that no lost motion occurs. As will be understood, a cam disc having a cam groove engaged by a cam follower may be arranged in lieu of a cam plate.

The length of the roller is so chosen with respect to the distance between the inner ends of sleeves 9 that the last partition wall as each end of the roller remains inside sleeve 9 during the whole axial movement of the roller. Thus, the interior of the sleeve always remains closed off from hopper 1.

As shown in Fig. 4, the hopper has a funnel shaped lower portion consisting of side walls 21 and 22. Wall 21 extends substantially tangential to the roller while the opposite side wall 22 has approximately similar inclination towards the roller but is slightly spaced therefrom, as shown. The latter arrangement serves to ensure that a granulated material shall not be crushed between the roller and the wall 22. If the machine is intended for use only in connection with fertilizers, both side walls may extend tangentially to the roller.

Longitudinal support bar 23 is arranged below the roller and carries a plurality of vertically projecting plates or scrapers 24 adapted to engage the circumference of the core shaft, or the spacing sleeves 6 secured thereon, thus blocking grooves 3. The bar 23 is held in engagement with the circumference of the roller by means of support bearings 25 in which it is longitudinally slidable. The bearings 25 are positioned on the upper end of shafts 26 supported vertically adjustable in support hoops 27 extending across the lower side of the hopper and the free ends of which are secured to opposite sides of the hopper 1. The shafts 26 may be vertically adjusted by means of set screws 26' whereby the support bar 23 may be moved downwards in order to disengage the plates 24 from the roller grooves.

During rotation of the roller, the lower portions of the partition walls 4, as above described, effect an axial reciprocating motion and take along the plates 24 and thereby the bar 23, in said motion. However, to avoid engagement and wear between the partition walls 4 and the edges of the scraper plates 24, the end of the bar 23 adjacent the cam disc 4' is connected by link 28 to a slide 29 displaceably supported parallel to the axis of the roller in a guiding member 30 secured to the end cap 10 by bolt 30'. Cam plate 12' carrying two ball bearings 11' engaging opposite sides of the cam plate 4' is pivotally mounted on the slide by bolt 13' to impart to slide 29 and thereby to bar 23 a positive reciprocating movement in accordance with that of the roller.

Longitudinal guide rails 31 are arranged at each side of bar 23 and secured to the end walls 7 of the hopper, supported by the hoops 27 on braces 27'. Material discharge slit 32 extends along the entire length of the hopper between bottom wall 21 and adjacent guide rail 31. The width of the slit may be regulated by moving closing member 33 displaceably mounted between the outer surface of the wall 21 and guide arms 34 secured to a rod 35 extending between the end walls 8.

The position of closing member 33 may be adjusted by shaft 36 which is rotatably supported in bearings 37 in the end walls 8 and preferably also in bearings in the hoops 27. A plurality of levers 38 are keyed to shaft 36 in interspaced relationship, each lever being connected by links 39 with arms 40 secured to the closing member 33 and projecting at right angle therefrom. When the shaft 36 is rotated in one direction the width of the slit 32 decreases and by rotation in the other direction the width increases.

A similar arrangement is provided at the opposite wall 22 of the hopper with the difference that, instead of an elongated slit, a number of suitably spaced delivery openings 32' (Fig. 2) are spaced along the bottom of wall 22, said openings preferably tapering upwardly from the rail 31.

The adjusting shafts 36 of the closing members 33 are preferably spring loaded, such as by spring 41, Fig. 5, so that the shafts, when released, automatically rotate to that position in which the closing members 33 wholly close the slit 32 or holes 32', respectively. The rotation of the shafts 36 for uncovering the slit or holes respectively against the action of the spring mechanism may be effected by means of levers 42 secured on said shafts and connected by means of a line or linkage to an usual adjust- able operating lever (not shown) the locking member of which co-operates with an adjustable stop for exact regulation of the position of the closing member 33. By this arrangement the closing members always are passed automatically into closing position when said levers are released.

At the upper side of the roller, preferably resting on the circumference of the partition walls 4 is arranged a longitudinal support bar 43 carrying a number of scraper plates 24', corresponding to plates 24, which extend radially downwards into the grooves 3 of the roller and constitute fixed partition walls therein. The ends of bar 43 are received in corresponding end slots 9' in sleeves 9. Vertically slidable slides 7' support the bar 43 for vertical reciprocating movement in guide slots 7" in walls 7 so that scraper plates 24 may be moved out of engagement with the grooves of the roller. As shown in Fig. 4, guide rails 44 may be provided on the inside of end walls 7 to receive a partition wall 45 extending the length of the hopper, with its lower edge resting on support bar 43 whereby the wall 45 together with the plates 24' and 24 divides the hopper into two separate compartments A and B having a common feeding roller.

In this arrangement the machine may serve for simultaneously sowing or discharging two different types of material, either fertilizer and grains or seed, two different types of fertilizers, or two different types of grain or seed.

Supposing that the compartment A contains fertilizer, the machine operates in the following manner:

In driving the machine along the ground the driving wheels 2 rotate the roller by means of pawl and ratchet 15, 16. During this rotation the cam plate 4' runs between the followers 11 and imparts to the roller an axial reciprocating movement while its upper portion remains axially stationary between the followers, the length of the strokes being at least as great as the width of the grooves 3. Since the cam plate 4' is parallel to and has the same side profile as the partition walls 4, the upper portions of the walls will remain stationary in an axial direction between stationary plates 24'. However, diametrically opposite portions of the partition walls 4 at the lower side of the roller are reciprocated in the axial direction as above explained. The lower closing plates 24 therefore must be supported for a corresponding axial movement and the support 23 of said plates is accordingly connected to the axially movable slide 29 bearing the cam followers 11'.

When the closing member 33 is actuated to uncover the slit 32 to the desired degree, by rotating the shaft 36 against the action of the spring 41, the portions of the partition walls 4 facing the slit are axially reciprocated. This movement combined with the rotating movement of the roller discharges the fertilizer in an even stream from the slit in the whole length thereof, the reciprocating movement of the walls 4 being such that the paths of movement of adjacent walls 4 overlap each other.

If, at the same time, the compartment B contains grains, the same may be delivered through the openings 32' in rows corresponding thereto and in quantities corresponding to the uncovered area thereof.

With the partition wall 45 removed, the machine may be used for fertilizing only, in which case only one of the delivery slits is used.

In case the machine is to be used only for distributing fertilizer in rows through openings similar to the openings 32', the axial movement of the roller proper may be eliminated and the circumferential portions of the partition walls inside the separate openings may be arranged to sweep said openings in the whole axial length thereof which is not greater than the width of the grooves 3. To this end the inclination of the grooves is so chosen that the greatest axial distance between diametrically opposite points of a side confining surface of the groove corresponds to the width of the groove.

An embodiment showing this arrangement is illustrated in Figs. 3, 5 and 6, in which like reference numerals refer to equivalent parts in Figs. 1, 2 and 4. Hopper 1 is provided with an arcuated bottom portion 1' of slightly larger diameter than that of the roller which is so positioned that it tangentially engages the rear wall 1a of said portion.

Rear wall 1a is provided with openings 32a which may have rectangular or square shape, their upper sides lying in a horizontal plane through the axis of the roller (see Fig. 3). Above the openings 32a the wall of the hopper has an outwardly and upwardly inclined portion 1b supporting bar 23a for axially slidable movement parallel to the roller. Bar 23a carries plates 24a projecting radially into the grooves 3 between adjacent partition walls 4 and serving as scrapers.

The support member 23a hay be mounted on wall portion 1b by means of screws 46 passing through slits 47 in said portion, allowing necessary reciprocating motion of said support member 23a and thereby of the scrapers 24a secured thereto.

To regulate the effective area of the openings 32a use may be made of a closing member 33a mounted slideably on the outer side of the wall 1a parallel with the roller. Said member 33a is provided with openings corresponding to the openings 32a and by shifting said member 33a the openings therein may be brought to communicate more or less with the openings 32a thereby regulating the effective area of the latter accordingly.

The closing member 33a may be secured slideably in its longitudinal direction by means of screws 48 passing through slits 49 formed in said member 33a.

When the roller is rotating in the direction of the arrow (Fig. 3), the material is fed towards the openings 32a and, due to the action of the scrapers 24a, out through said openings in even streams resulting from the reciprocating movement of the circumferential portions of the partition walls 4 inside the openings as previously described.

In this embodiment, the roller is driven from the power take off shaft of a tractor which pulls the machine, by means of a worm gear 50 and a worm 51 mounted in a housing 52 secured within the hopper at the middle thereof. The support shaft 59 of the worm gear 50 may be arranged to constitute a middle portion of the core shaft 5 of the roller, having projecting end portions 53 received slideably in the bore 54 of said core shaft and keyed thereto.

The shaft 55 of the worm 51 projects through the front wall of the hopper.

In order to move or agitate the material in the hopper and prevent adhering of the same to its walls, arms 56 are pivotally secured to the hopper wall at 57. The lower arm ends are forked at 58 (see Fig. 5) to receive the circumferential portion of a partition wall 4, so that the arm is axially oscillated during rotation of the roller.

I claim:

1. An agricultural machine for spreading granular material, comprising a material supply hopper having a rear wall and two end walls, a rotatable roller positioned transversely within said hopper at the bottom thereof adjacent the rear wall, said roller having a plurality of adjacent circumferential grooves, a pair of sleeve-shaped support members having a bore corresponding to the diameter of said roller, means for securing the support members to each of said hopper end walls, roller bearing members secured to said sleeve shaped support members to support said roller rotatably, the rear wall of the hopper having a horizontal row of discharge openings positioned to have their upper edges level with a horizontal plane through the axis of the roller, a closing member movably secured to the outside of the rear wall for regulating the effective area of said openings, scraper means mounted on the rear wall for transverse movement in respect of the roller and radially projecting into the circumferential grooves therein at a position behind said openings with regard to the direction of rotation of the roller, and means for rotating said roller.

2. The agricultural machine of claim 1, wherein said roller rotating means comprises a worm gearing and means for connecting said gearing to a power take-off shaft of a tractor adapted to move said machine.

3. The agricultural machine of claim 2, wherein the worm gearing comprises a gear wheel having a shaft extending from both sides thereof and the roller is formed in two sections with the inner ends of the roller sections detachably keyed to gear wheel shaft.

4. The agricultural machine of claim 1, wherein said roller comprises a core shaft and said roller bearing members are detachably secured to the outer ends of the sleeve shaped support members for rotatably supporting said shaft.

5. The agricultural machine of claim 4, wherein said roller bearing members are removably mounted end plates closing the outer ends of the sleeve shaped members.

6. An agricultural machine of the type referred to, comprising a supply hopper having two end walls, front and rear walls with lower portions converging toward the bottom of the hopper, one of said converging lower portoins having a transverse discharge slit across the length of the hopper, the other converging wall portion having a transverse row of spaced discharge openings, a rotatable roller mounted transversely within said hopper at the bottom thereof and adjacent the discharge slit and openings, said roller having a plurality of parallel circumferential grooves inclined with respect to the axis thereof, means for transversely reciprocating the grooves in relation to the discharge slit and openings upon rotation of the roller, a plurality of scrapers projecting radially into said grooves at points lying behind the slit and openings respectively in respect to the direction of rotation of said roller, adjustable closing means for said slit and openings respectively, and means for rotating the roller.

7. The agricultural machine of claim 6, comprising relatively thin, sheet-like partition walls separating the circumferential grooves, the partition walls forming right angles with the axis of the roller.

8. The agricultural machine of claim 7, wherein the inclination of the partition walls is such that the greatest axial distance between diametrically opposite points thereof is at least equal to half the width of the groove.

9. The agricultural machine of claim 6, wherein the roller consists of a core shaft with said partition walls mounted thereon in the form of annular sheets.

10. The agricultural machine of claim 6, wherein said adjustable closing means comprise respective closing plates mounted for relative movement in respect of said slit and openings, respectively.

11. The agricultural machine of claim 10, comprising spring means biasing the closing plates to move them into closing position.

12. The agricultural machine of claim 11, wherein said adjustable closing means comprises transversely mounted rotatable control shafts, said spring means biasing said control shafts, and link means connecting said control shafts to a respective one of said closing plates.

13. The agricultural machine of claim 6, comprising a pair of sleeve-shaped roller support members having a bore corresponding to the diameter of said roller, means for securing the support members to each of said hopper end walls with their outer ends extending outside the walls, and a pair of driving wheels rotatably mounted on the extended sleeve members which serve as bearing shafts for the wheels.

14. The agricultural machine of claim 13, comprising driving connection means between at least one of said driving wheels and a respective end of said roller, said driving connection means being operative to drive the roller when the wheel is driven forwardly and being inoperative when the driving wheel is rotated in the opposite direction.

15. The agricultural machine of claim 14, wherein said roller comprises a core shaft, and comprises shaft bearing members mounted at the outer ends of the sleeve shaped support members, the shaft extending through and outside of said bearing members, and said driving connection means comprises a ratchet wheel mounted at the extending end of the shaft, a spring-loaded pawl member engaging the ratchet wheel, and a shaft projecting from the driving wheel parallel to the axis thereof which pivotably carries the spring-loaded pawl.

16. The agricultural machine of claim 6, comprising a pair of sleeve-shaped roller support members having a bore corresponding to the diameter of said roller and means for securing the support members to each of said hopper end walls, each end of the roller projecting into the adjacent sleeve-shaped support member to such an extent that the outermost circumferential grooves of the roller remain outside the adjacent inner end of the support member at all axial reciprocating positions of the roller.

17. The agricultural machine of claim 6, comprising an axially slidable support means for the scrapers lying behind the discharge openings.

18. The agricultural machine of claim 17, comprising two parallel transverse guide rails mounted at the bottom of the hopper at both sides of the slidable scraper support means, said scrapers projecting radially upwardly from said support means to the bottoms of the respective circumferential roller grooves to close said grooves at the lower side of the roller between the discharge slit and row of discharge openings, the guide rails forming the lower edges of the discharge slit and openings, respectively, and being shaped to engage the circumference of the roller.

19. The agricultural machine of claim 17, wherein the axially slidable support means is an axially reciprocable bar, and comprising vertically adjustable sliding bearings for said bar.

20. The agricultural machine of claim 6, comprising a support bar mounted at the top of the roller and engaging its circumference, said support bar extending transversely along the entire length of the hopper and carrying a plurality of said scrapers extending radially down into respective ones of said circumferential grooves to the bottoms thereof to close the grooves in the vertical axial plane of the roller.

21. The agricultural machine of claim 20, comprising a hopper partition wall, guide and support means mounted on each of the hopper end walls for removably guiding and supporting said hopper partition wall with its lower edge resting on said last-named support bar, whereby the hopper may be divided into two transverse compartments.

22. An agricultural machine for spreading granular material, comprising a material supply hopper having a rear wall, the lower portion of said rear wall having a transverse row of discharge openings, a transverse roller rotatably supported in the hopper adjacent said openings and comprising a plurality of inclined annular partition walls having side surfaces perpendicular to the axis of the roller, the partition walls defining parallel circumferential grooves in the roller inclined in respect to its axis, said grooves being in communication with said discharge openings, a plurality of scrapers having a width corresponding to the width of said grooves and projecting radially into said grooves at a position behind said openings in respect to the direction of rotation of the roller, a support member for said scrapers which is slidably mounted parallel to said roller, and driving means for rotating said roller.

23. The agricultural machine of claim 22, wherein the inclination of the partition walls is such that the greatest axial distance between diametrically opposite points thereof is at least equal to half the width of the groove.

24. The agricultural machine of claim 22, wherein the partition walls are sheet-like blades.

25. The agricultural machine of claim 22, comprising at least one material agitating member pivotally secured to a front wall of the hopper and provided with fork-shaped ends straddling the marginal portion of a corresponding one of said partition walls.

26. The agricultural machine of claim 6, wherein said roller comprises a core shaft and a plurality of spaced annular partition walls mounted thereon to form said circumferential grooves therebetween, the wall being perpendicular to the core shaft axis, and comprising a pair of sleeve-shaped shaft support members mounted in the hopper end walls, said roller reciprocating means including a cam mounted on said core shaft with cam surfaces parallel to said partition walls and a pair of cam followers pivotally mounted on one of said sleeve-shaped support members against axial movement, said cam being engaged at both sides by the cam followers.

27. The agricultural machine of claim 26, comprising a support member for said cam followers detachably mounted in said sleeve-shaped shaft support member.

References Cited in the file of this patent

UNITED STATES PATENTS

| | | |
|---|---|---|
| 1,573,493 | Heyd | Feb. 16, 1926 |
| 1,650,808 | Van Brunt | Nov. 29, 1927 |
| 2,626,729 | Ajero | Jan. 27, 1953 |